US006995799B2

(12) United States Patent
Itoh et al.

(10) Patent No.: US 6,995,799 B2
(45) Date of Patent: Feb. 7, 2006

(54) PORTABLE INFORMATION COMMUNICATION APPARATUS WITH ROTATING MECHANISM

(75) Inventors: Hisanori Itoh, Osaka (JP); Daigo Yoshioka, Toyonaka (JP); Yoshio Nakagawa, Sakai (JP); Naohiko Hayashi, Sakai (JP); Shoichi Minato, Sakai (JP)

(73) Assignee: Minolta Co., Ltd., Osaka (JP)

( * ) Notice: Subject to any disclaimer, the term of this patent is extended or adjusted under 35 U.S.C. 154(b) by 663 days.

(21) Appl. No.: 09/812,593

(22) Filed: Mar. 21, 2001

(65) Prior Publication Data

US 2002/0015102 A1    Feb. 7, 2002

(30) Foreign Application Priority Data

Mar. 27, 2000    (JP)    ............................ P2000-085990

(51) Int. Cl.
*H04N 5/222*    (2006.01)

(52) U.S. Cl. .................................. 348/333.06; 348/335

(58) Field of Classification Search ........... 348/207.99, 348/207.1, 207.11, 211.99, 211.1, 211.2, 348/211.3, 211.4, 211.8, 211.9, 211.12, 211.13, 348/14.01, 14.02, 14.03, 333.01, 333.06, 348/333.09, 373, 374, 375; 455/575.1, 556.1, 455/569.1, 348
See application file for complete search history.

(56) References Cited

U.S. PATENT DOCUMENTS 5,491,507 A *   2/1996   Umezawa et al. ........ 348/14.02
5,666,159 A     9/1997   Parulski et al.
5,790,193 A *   8/1998   Ohmori ....................... 348/375
6,141,505 A    10/2000   Miyata et al.
6,192,257 B1    2/2001   Ray
6,295,088 B1 *  9/2001   Tsukahara et al. ..... 348/333.06
6,473,631 B1 * 10/2002   Siddoway et al. ........ 455/575.1
6,697,117 B1 *  2/2004   Park ........................... 348/373

FOREIGN PATENT DOCUMENTS

JP    9-322138    12/1997
JP    10-257367    9/1998

* cited by examiner

*Primary Examiner*—Tuan Ho
(74) *Attorney, Agent, or Firm*—Morrison & Foerster LLP

(57) ABSTRACT

An information communication apparatus for conducting information communication such as a telephone conversation, sending and reception of E-mails and the like and for capturing an image of a subject comprises an image capturing unit for capturing an image through the zoom optical system, and a body unit for displaying an image and accepting a user's input. A rotating mechanism is provided between the image capturing unit and the body unit. When a user conducts information communication or carries the information communication apparatus, the image capturing unit is positioned so that the optical axis of the zoom optical system is substantially parallel to a display screen of a display. This prevents impairment of the portability of the information communication apparatus. When the user captures an image, the image capturing unit is positioned so that the optical axis of the zoom optical system is substantially perpendicular to the display screen of the display. This allows the user to capture images of a subject behind the body unit and the face of the user while viewing the display.

10 Claims, 6 Drawing Sheets

F I G . 3
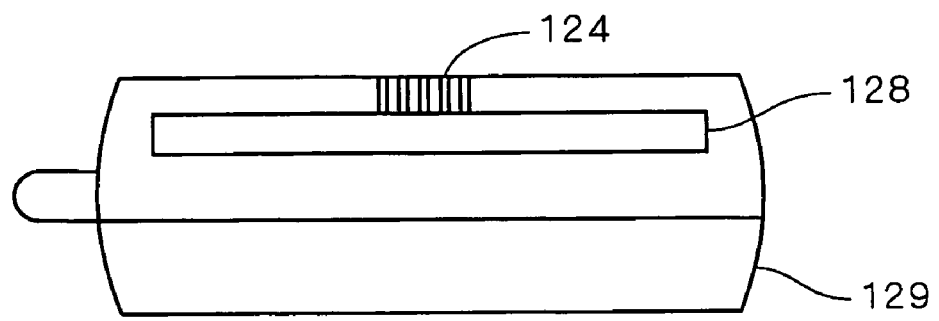
F I G . 4
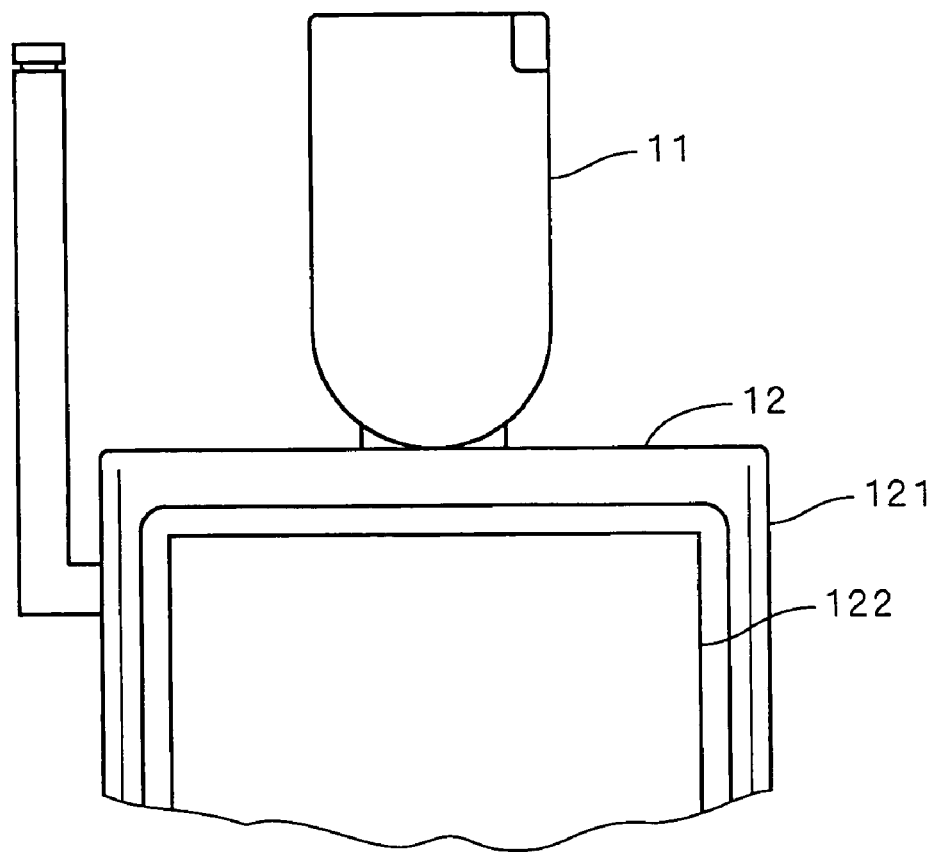

PORTABLE INFORMATION COMMUNICATION APPARATUS WITH ROTATING MECHANISM

This application is based on application No. 2000-85990 filed in Japan, the contents of which are hereby incorporated by reference.

BACKGROUND OF THE INVENTION

1. Field of the Invention

The present invention relates to a portable information communication apparatus for conducting information communication.

2. Description of the Background Art

Conventionally, there has been a portable videophone comprising a liquid crystal display and a small-sized digital camera for image capturing which are provided on the same surface of a portable telephone as control buttons. Such a portable telephone is provided with a camera for the purpose of showing the face of a user to the party on the other end of the telephone connection. Thus, an optical system of the camera employs a fixed-focal-length lens having a limited image capturing area.

However, the portable telephone provided with the camera including the fixed-focal-length lens is not suitable for transmission of video information about landscapes around the user.

SUMMARY OF THE INVENTION

The present invention is intended for a portable information communication apparatus for conducting information communication.

According to one aspect of the present invention, the information communication apparatus comprises: an image capturing device for obtaining an image of a subject through a zoom optical system; a body casing connected to the image capturing device; a communicator for conducting information communication with the exterior; a display disposed on the body casing for displaying the image obtained by the image capturing device; and a rotating mechanism for changing a positional relationship of the image capturing device and the body casing relative to each other between a first position in which an optical axis of the image capturing device and a display screen of the display are substantially parallel to each other and a second position in which the optical axis of the image capturing device and the display screen of the display are substantially perpendicular to each other.

In the information communication apparatus, the zoom optical system allows a user to capture images at various magnifications.

According to another aspect of the present invention, the length of the image capturing device along the optical axis is approximately equal to the width of the body casing along the optical axis when in the first position.

This allows the user to comfortably carry the information communication apparatus along.

According to still another aspect of the present invention, the information communication apparatus further comprises a group of control buttons provided on a surface of the body casing facing in substantially the same direction as the display screen for accepting a user input.

Therefore, the user can operate the information communication apparatus while viewing the display.

It is therefore an object of the present invention to increase the image capturing area of an information communication apparatus such as a portable telephone.

It is another object of the present invention to maintain ease of portableness (referred to hereinafter as "portability") and operability of an information communication apparatus at satisfactory levels.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a bottom view of the information communication apparatus;

FIGS. 4 and 5 show an image capturing unit when rotated;

DESCRIPTION OF THE PREFERRED EMBODIMENTS

Figure 1:
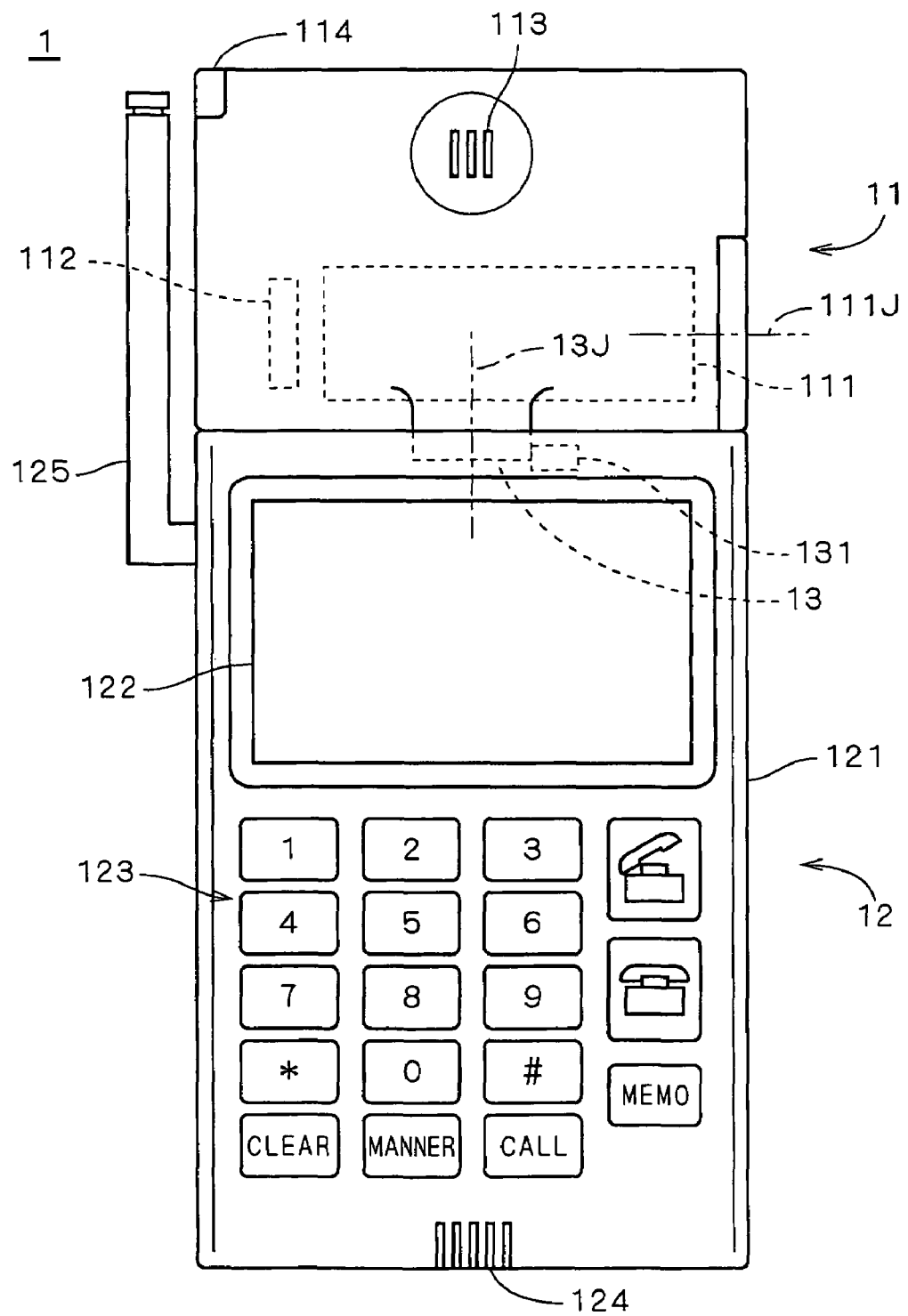
FIG. 1 is a front view of an information communication apparatus.
Figure 2:
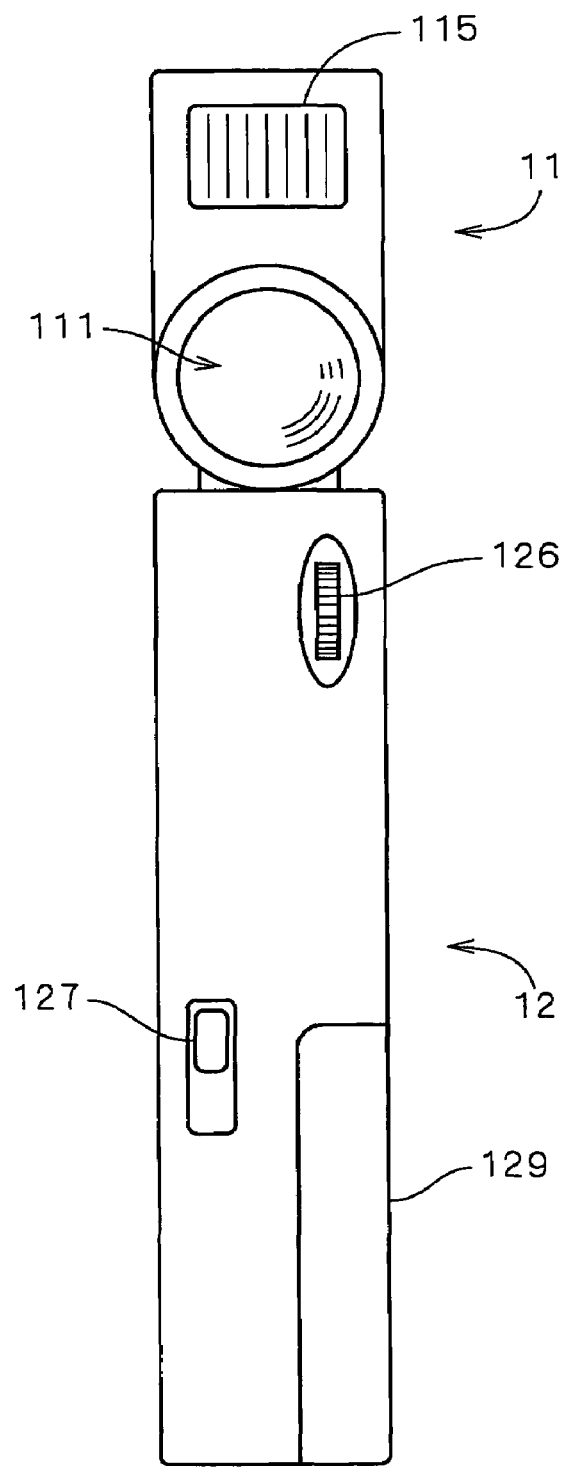
FIG. 2 is a side view of the information communication apparatus, as viewed from the right-hand side of FIG. 1.

FIG. 1 is a front view showing the outward appearance of an information communication apparatus 1 according to one preferred embodiment of the present invention. FIG. 2 is a side view of the information communication apparatus 1, as viewed from the right-hand side of FIG. 1, and FIG. 3 is a bottom view of the information communication apparatus 1. The information communication apparatus 1 is used as a portable telephone, and is also usable as a digital camera for capturing an image of a subject. The information communication apparatus 1 comprises an image capturing unit 11 and a body unit 12.

As illustrated in FIG. 1, the image capturing unit 11 comprises a zoom optical system 111 and a CCD 112 including a photoreceptor array both incorporated therein, and functions as a digital camera for capturing an image of a subject through the zoom optical system 111. The image capturing unit 11 is capable of capturing not only still images but also moving images. The image capturing unit 11 further comprises a speaker or earpiece 113 which works when the information communication apparatus 1 is used as a portable telephone, an LED 114 for indicating an incoming call and the state of charge, and a flash 115, as shown in FIG. 2, disposed over the zoom optical system 111 for emitting flash light, as required, when capturing an image.

The dimension of the image capturing unit 11 along an optical axis 111J of the zoom optical system 111 is longer than the dimension of the image capturing unit 11 in a direction perpendicular to the optical axis 111J.

The body unit 12 is covered with a body casing 121 having a front surface provided with a display 122 for displaying various types of information to a user during a telephone conversation, sending and reception of E-mails, reception of various information services and the like (all of which are generically referred to hereinafter as "information communication"), a group of control buttons 123 for accepting various manual inputs including user inputs of a telephone number and characters, and a microphone 124 for use during a telephone conversation. The provision of the display 122 and the group of control buttons 123 on the same surface of the body casing 121 or on surfaces thereof facing in substantially the same direction allows the user to operate the information communication apparatus 1 while viewing a display screen of the display 122.

The dimension of the body unit 12 in a direction perpendicular to the screen of the display 122 is shorter than the dimension of the body unit 12 in a direction parallel to the screen.

The display 122 produces a live view display of images successively captured by the image capturing unit 11 and displays a playback of an image obtained by image capturing. The microphone 124 not only is used during a telephone conversation but also functions to record voice information.

An antenna 125 for sending and receiving information is connected to a left-hand side surface of the body unit 12. As illustrated in FIG. 2, a right-hand side surface of the body unit 12 is provided with a jog dial 126 having functions during information communication and during image capturing which are different from each other, and a card ejection lever 127 for use in ejecting a memory card. The memory card is inserted into and ejected from a card slot 128 provided in a lower part of the body unit 12, as illustrated in FIG. 3. Various types of information about the user and data about captured images are recorded on the memory card. A rear surface of the body unit 12 receives a removable power supply (battery pack) 129.

As depicted in FIG. 1, the image capturing unit 11 and the body unit 12 are connected to each other through a rotating mechanism 13, and the image capturing unit 11 is rotatable relative to the body unit 12 about an axis of rotation 13J substantially parallel to the display screen of the display 122. This allows a change in positional relationship of the image capturing unit 11 and the body casing 121 relative to each other to be made between the position shown in FIG. 1 in which the optical axis 111J of the zoom optical system 111 is substantially parallel to the display screen of the display 122 and the position shown in FIG. 4 in which the optical axis 111J is substantially perpendicular to the display screen.

With the image capturing unit 11 in the position shown in FIG. 4, the user captures images of a subject including a landscape and a person present beyond the body unit 12 while viewing the display screen. Further, as shown in FIG. 5, the user can rotate the image capturing unit 11 from the position shown in FIG. 1 through 90 degrees toward the user to place the zoom optical system 111 into face-to-face relation with the face of the user, thereby using the information communication apparatus 1 as a videophone.

The rotating mechanism 13 includes a lens direction detector 131 (See FIG. 1) for detecting the positional relationship of the image capturing unit 11 and the body casing 121 relative to each other. Selection between operating modes of the information communication apparatus 1 is automatically made depending on the orientation of the image capturing unit 11, which will be described later.

During information communication, the image capturing unit 11 is positioned in principle so that the optical axis 111J of the zoom optical system 111 is substantially parallel to the display screen of the display 122, as shown in FIG. 1. The information communication apparatus 1 is designed so that, in the position shown in FIG. 1, the length of the image capturing unit 11 along the optical axis 111J is approximately equal to the width of the body casing 121 (the width along the optical axis 111J in the position shown in FIG. 1). The zoom optical system 111 has a shape elongated along the optical axis 111J for structural reasons. In other words, the dimension of the zoom optical system 111 along the optical axis 111J is longer than the dimension of the zoom optical system 111 in a direction perpendicular to the optical axis 111J. Therefore, positioning the zoom optical system 111 in parallel to the display screen of the display 122 during information communication allows the zoom optical system 111 to be housed in a case approximately equal in width to the body unit 12. The dimension of the zoom optical system 111 (or the image capturing unit 11) in a direction perpendicular to the optical axis 111J is also approximately equal to the dimension of the body unit 12 in a direction perpendicular to the screen of the display 122.

Figure 5:
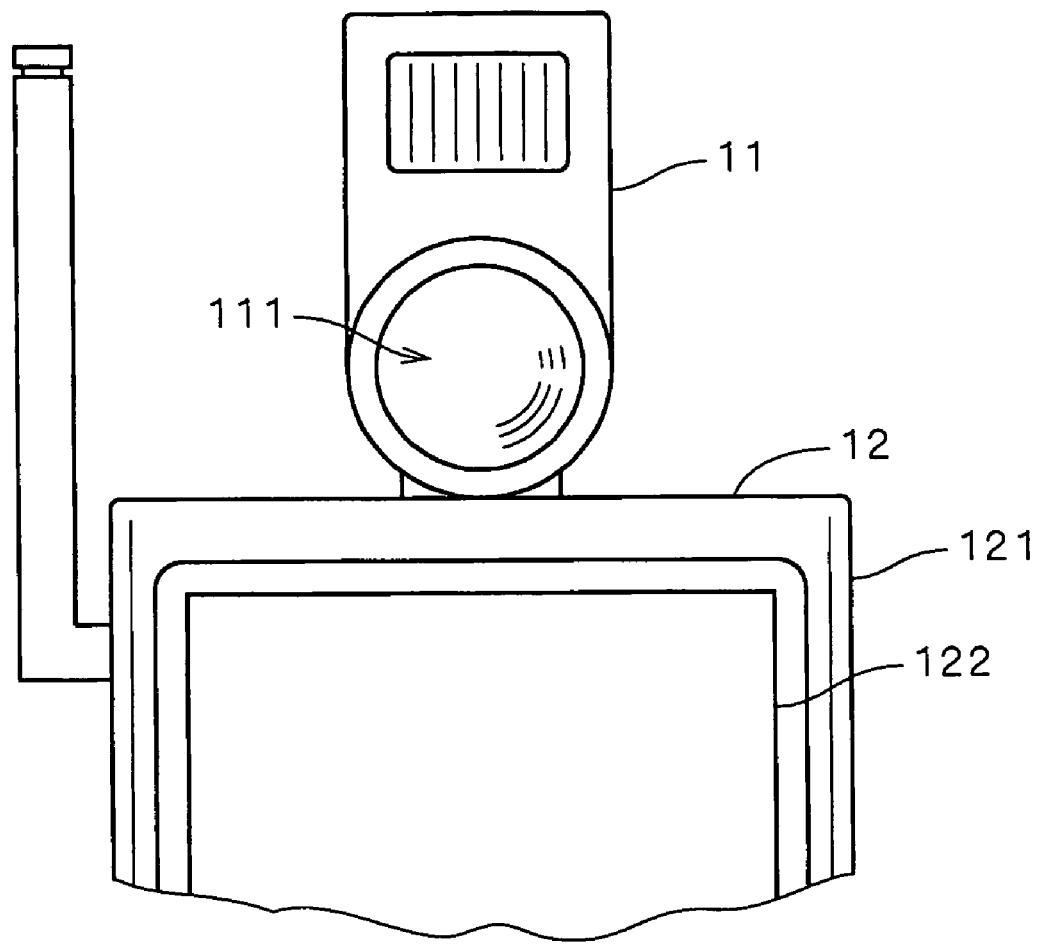

In contrast, if the zoom optical system 111 were fixedly connected to the body unit 12 in the positions shown in FIGS. 4 and 5, the information communication apparatus 1 would be shaped to have a great protrusion extending in a direction perpendicular to the display screen (or shaped to have a great thickness in the depth direction), to become less portable. However, the information communication apparatus 1 shown in FIG. 1 is designed so that the length of the image capturing unit 11 along the optical axis 111J is approximately equal to the width of the body unit 12 and so that the zoom optical system 111 may be positioned in parallel to the display screen of the display 122 except when capturing images. Therefore, the portability of the information communication apparatus 1 is not impaired.

Figure 6:
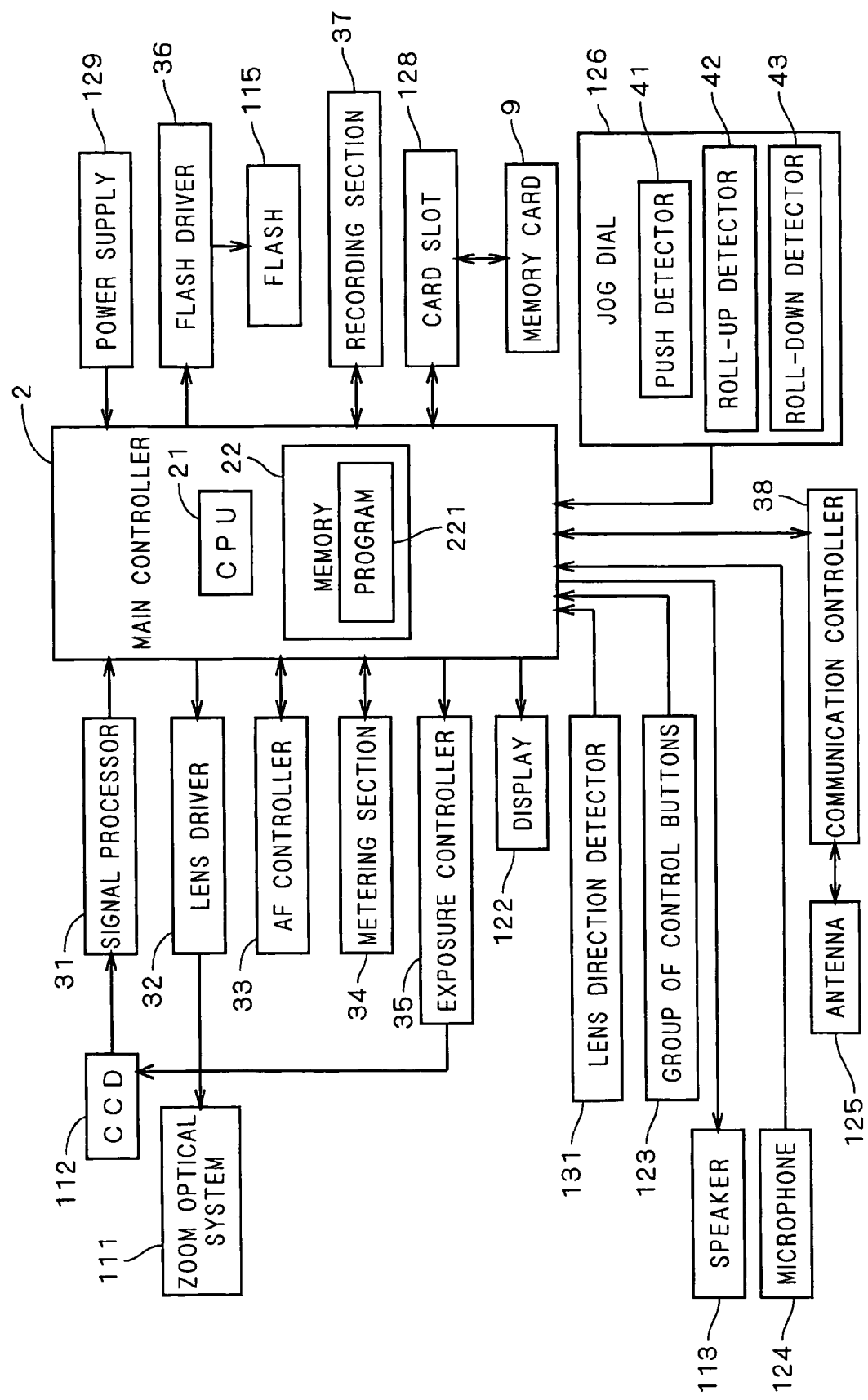
FIG. 6 is a block diagram showing components of the information communication apparatus.

FIG. 6 is a block diagram showing components of the information communication apparatus 1, particularly about a main controller 2 therein. As shown in FIG. 6, the main controller 2 is electrically connected to the various components of the information communication apparatus 1 to control the entire operation of the information communication apparatus 1. The main controller 2 includes a CPU 21 for performing various computations, and a memory 22 for storing an operating program 221 therein. The CPU 21 performs the computations in accordance with the program 221 to effect the operation of the information communication apparatus 1.

The main controller 2 is connected to a signal processor 31 for converting an image signal from the CCD 112 into a digital signal, a lens driver 32 for controlling the operation of the zoom optical system 111, an AF controller 33 for generating an autofocusing signal from the condition of an image, a metering section 34 for detecting the brightness of the image, and an exposure controller 35 for controlling the charge storage time in the CCD 112.

The lens driver 32 effects zooming and focusing in accordance with user's operation or the signal from the AF controller 33. When the user performs a release operation, the exposure controller 35 effects exposure control of the CCD 112, based on information from the metering section 34. Also, the zoom optical system 111 may comprise a shutter which effects the exposure control.

The display 122, the lens direction detector 131, the group of control buttons 123, the speaker 113 and the microphone 124 which are described above are also connected to the main controller 2 to transmit input/output information to the user. The power supply 129 supplies electric power to the main controller 2, and supplies electric power, as required, to other components. A flash driver 36 controls the state of charge of a flash power supply, based on a signal from the main controller 2, to control the light emission from the flash 115.

A recording section 37 is a memory for temporarily recording image data obtained by the image capturing unit 11. The recorded image data is transferred from the recording section 37 through a card slot 128 to a memory card 9, as needed, in accordance with a user's instruction. Additionally, the recording section 37 can receive the image data recorded on the memory card 9 through the card slot 128 so that a playback of the image is displayed on the display 122.

A communication controller 38 is a section for communicating with the exterior through the antenna 125. In the information communication apparatus 1, the communication controller 38 communicates with an antenna of a telephone office by using radio waves.

The jog dial 126 has a disk-shaped rotary member (designated by the reference numeral 126 in FIG. 2). The jog dial 126 further comprises a push detector 41 for detecting a push of the rotary member, a roll-up detector 42 for detecting counterclockwise rotation of the rotary member, and a roll-down detector 43 for detecting clockwise rotation of the rotary member. Such an arrangement achieves various operations efficiently.

During information communication such as a telephone conversation, the jog dial 126 is used to select and determine a telephone number and an information selection items displayed on the display 122. More specifically, when the user rotates the rotary member, a tentatively selected item is changed in order between a plurality of items displayed on the display 122, based on signals from the roll-up detector 42 and the roll-down detector 43. Then, when the user pushes the rotary member inwardly of the body casing 121, the selection of the tentatively selected item is determined, based on a signal from the push detector 41.

During image capturing, on the other hand, the jog dial 126 functions as an operating device associated with image capturing. More specifically, when the user rotates the rotary member in a counterclockwise direction, the lens moves toward a telephoto end, based on the signal from the roll-up detector 42. When the user rotates the rotary member in a clockwise direction, the lens moves toward a wide-angle end, based on the signal from the roll-down detector 43. After the zoom magnification of the zoom optical system 111 is changed by the rotation of the rotary member, the user pushes the rotary member inwardly of the body casing 121 to effect a release operation based on the signal from the push detector 41.

Thus, the information communication apparatus 1 facilitates the zooming and release operations by the use of the jog dial 126. The push detector 41 may be capable of detecting a half-pressed position and a full-pressed position. In this case, focusing is performed when the rotary member is pushed into the half-pressed position, and release is performed when the rotary member is pushed into the full-pressed position.

For recording of a captured image on the memory card, a compression rate is selected by rotating the rotary member, and a recording process is performed by pushing the rotary member in. The information communication apparatus 1 may be adapted so that the user's operations using the jog dial 126 can be performed also using the control buttons 123. For playback of a captured image, an image to be played back is selected by rotating the rotary member, and the image is played back by pushing the rotary member in.

The information communication apparatus 1 is usable as a videophone which allows the user to have a telephone conversation while sending a moving image. In this case, communication of information about pictures and a telephone conversation is carried out while the image capturing unit 11 in the positions shown in FIGS. 4 and 5 performs continuous image capturing. In such an operation, the zoom magnification is changed by rotating the rotary member of the jog dial 126, and a high-definition picture is sent by pushing the rotary member in. The high-definition picture contains a large amount of information, and it takes long time to send such a high-definition picture. For these reasons, the information communication apparatus 1 informs the user that the high-definition picture is being sent by blinking the LED 114 or overlaying a message such as "sending" upon a current display screen of the display 122.

Figure 7:
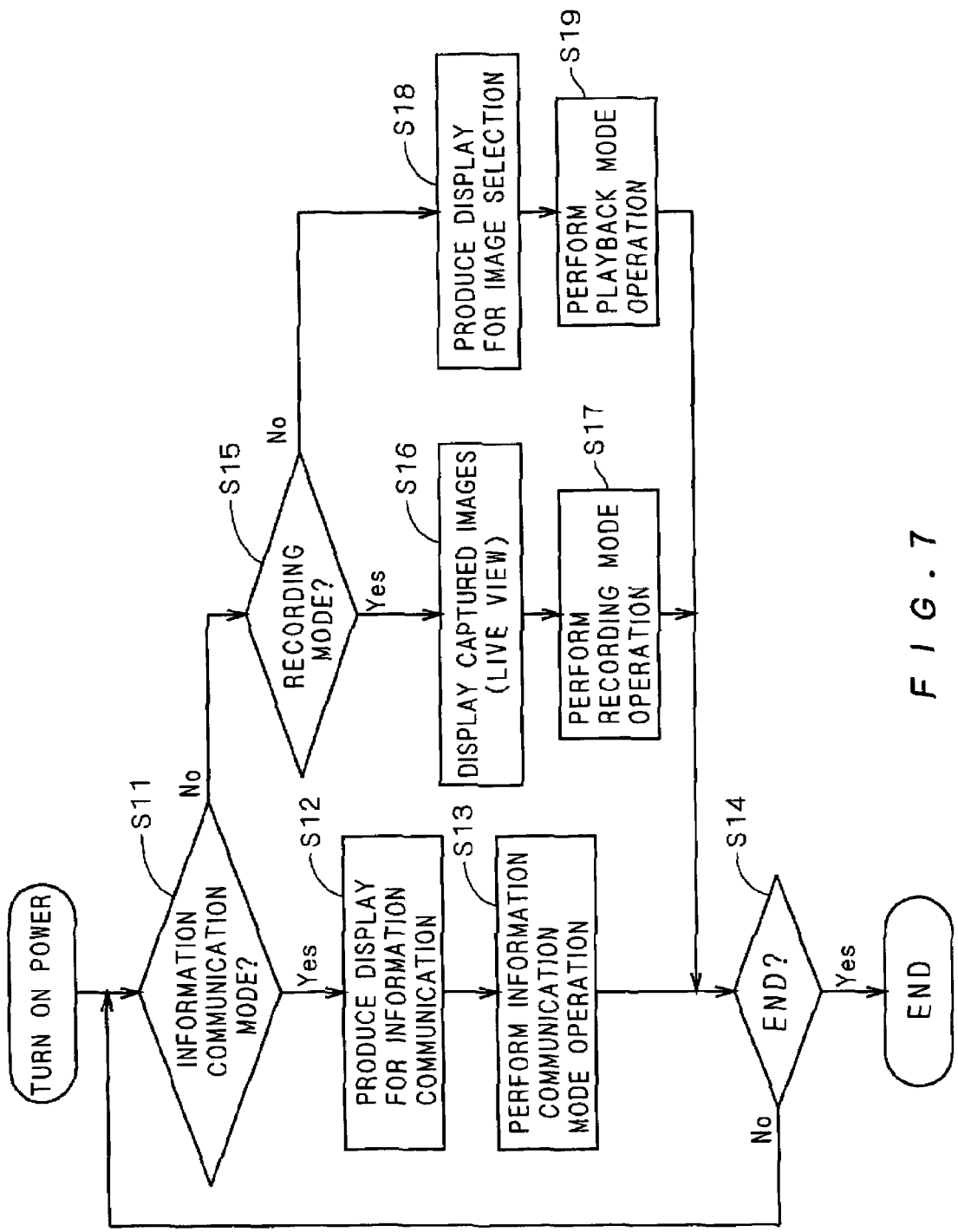
FIG. 7 is a flow diagram showing a general operation of the information communication apparatus.

FIG. 7 is a flow diagram showing the outline of a flow of operation of the information communication apparatus 1. The information communication apparatus 1 has an information communication mode for a telephone conversation and for transfer of information, a recording mode for image capturing, and a playback mode for playback of a captured image.

When power is turned ON, the information communication apparatus 1 checks up on its initial state within a predetermined length of time. The checking process includes checking up on the positional relationship between the image capturing unit 11 and the body unit 12, based on a signal from the lens direction detector 131. If it is detected at turn-ON that the optical axis 111J of the zoom optical system 111 and the display screen of the display 122 are substantially parallel to each other, the information communication apparatus 1 is automatically placed into the information communication mode (Step S11). Then, a menu for information communication appears on the display 122 (Step S12). Thereafter, the information communication apparatus 1 performs an information communication operation which includes allowing the user to have a telephone conversation, sending and receiving an E-mail, and receiving an information service, in response to a manual input from the user (Step S13).

If it is detected at turn-ON that the optical axis 111J of the zoom optical system 111 and the display screen of the display 122 are substantially perpendicular to each other and the image capturing unit 11 faces in the opposite direction from the display 122 as shown in FIG. 4, the information communication apparatus 1 is automatically placed into the recording mode (Step S15). In the recording mode, a live view display of captured images is produced on the display 122 (Step S16), which allows the user to capture an image or operate the information communication apparatus 1 while viewing the display screen of the display 122. An image is obtained and stored in accordance with the operation of the user (Step S17).

Selectable types of image capturing include single and continuous image capturing of still images, interval photographing, bracket photographing (in which an exposure value is automatically varied in a series of photographing), and image capturing of moving images.

If it is detected at turn-ON that the optical axis 111J of the zoom optical system 111 and the display screen of the display 122 are substantially perpendicular to each other and the image capturing unit 11 faces in the same direction as the display 122 as shown in FIG. 5, the information communication apparatus 1 is also automatically placed into the recording mode (Step S15). At the same time, the lens in the zoom optical system 111 moves toward the wide-angle end. This allows the capture of an image of the user's face adjacent to and opposed to the image capturing unit 11. Additionally, a live view display of captured images is produced on the display 122, and the recording mode operation is performed (Steps S16 and S17). The user can obtain and store a captured image while viewing the captured image of his/her face.

The information communication apparatus 1 is adapted to automatically change between the operating modes in response to a change in orientation of the image capturing unit 11 when the apparatus 1 is in use. If the image capturing unit 11 is rotated to the position in which the optical axis 111J of the zoom optical system 111 is substantially parallel to the display screen during the execution of the recording mode operation, the information communication apparatus 1 terminates the recording mode operation and is automatically placed into the information communication mode (Steps S17, S14, and S11 to S13). If the image capturing unit 11 is rotated to the position in which the optical axis 111J of the zoom optical system 111 is substantially perpendicular to the display screen during the execution of the information communication mode operation, the information communication apparatus 1 terminates the information communication mode operation and is automatically placed into the recording mode (Steps S13, S14, S11, and S15 to S17).

Then, the jog dial 126 automatically changes its function so as to conform to each of the operating modes. Specifically, the jog dial 126 accepts a user's operation associated with information communication when the information communication apparatus 1 is placed into the information communication mode, and accepts a user's operation associated with image capturing when the apparatus 1 is placed into the recording mode.

If the user performs an operation which causes a change to a different operating mode even during the execution of the operation in any operating mode, the information communication apparatus 1 is placed into the different operating mode, independently of the orientation of the image capturing unit 11. Thus, although the information communication apparatus 1 automatically enters the information communication mode or the recording mode immediately after power is turned ON, a change to the playback mode is made by specifying the playback mode.

In the playback mode, a display for selection between images recorded on the memory card is produced (Step S18). A playback mode operation is performed which displays an image selected by the user on the display 122 (Step S19). In this process, the jog dial 126 accepts a user's operation associated with image playback.

If the information communication mode or the recording mode is specified during the execution of the playback mode operation, the information communication apparatus 1 terminates the playback mode operation and is automatically placed into the specified operating mode. Such a change between the operating modes is repeated until the user performs an ending operation by turning OFF the power (Step S14).

For the use of the information communication apparatus 1 as the videophone, the user gives the apparatus 1 an instruction to operate as the videophone during the execution of the information communication mode operation. Then, the information communication apparatus 1 performs the information communication mode operation and the image capturing operation.

As described hereinabove, the information communication apparatus 1 which is portable and has the zoom optical system 111 in the image capturing unit 11 can capture images at various magnifications.

The rotatable connection between the image capturing unit 11 and the body casing 121 allows the image capturing unit 11 to be positioned so that the optical axis 111J of the zoom optical system 111 is substantially parallel to the display screen of the display 122. This provides the shape of the image capturing unit 11 held compact without impairing the portability of the information communication apparatus 1 when conducting information communication and when being carried. During image capturing, positioning the image capturing unit 11 so that the optical axis 111J is substantially perpendicular to the display screen allows the user to capture images of a subject behind the apparatus 1 and his/her face while viewing the display 122.

Further, the information communication apparatus 1 is designed so that, with the optical axis 111J substantially parallel to the display screen, the length of the image capturing unit 11 along the optical axis 111J is approximately equal to the width of the body unit 12 along the optical axis 111J,. Therefore, the information communication apparatus 1 is simple in entire shape to achieve further enhancement of the portability.

Additionally, the jog dial 126 accepts the user's operation of the zoom optical system 111 and the user's release operation in image capturing as well as the user's operation for information communication. Thus, the information communication apparatus 1 has a simplified arrangement for user's operation of the image capturing unit 11 including the zoom optical system 111.

Although the information communication apparatus 1 according to the one preferred embodiment has been described hereinabove, various modifications may be made to this preferred embodiment.

For example, the information communication apparatus 1 is not limited to the portable telephone provided with the digital camera, but may be other portable mobile equipment. Further, it is preferable that the image capturing unit 11 of the preferred embodiment is applied to an information communication apparatus in which the display and the control buttons are provided on the surfaces of the body casing which face in the same direction. However, it is not always necessary that the control buttons are provided on the surface facing in the same direction as the display, but may be provided separately from the body casing.

The zoom optical system 111 for use in the image capturing unit 11 may be driven by any system. The CCD 112 is not limited to a single-plate type CCD but may be of various types.

A mechanism for rotating the image capturing unit 11 is not limited to those illustrated in FIGS. 4 and 5. For example, the rotatable image capturing unit 11 may be provided on the right-hand or left-hand side of the display 122 of FIG. 1. In such a modification, the image capturing unit 11 may be designed to elongate up to the height of the body casing 121 without impairing the portability of the information communication apparatus 1. Alternatively, the image capturing unit 11 may be provided on the underside of the body casing 121.

Although it is preferable to use the jog dial 126 as an operating device for changing functions between the information communication mode and the recording mode, other operating devices may be used. For example, an operating device which accepts sliding and push-in operations or an operating device having an arrangement of an up selection button, a down selection button, and an OK button may be used.

Furthermore, information communication between the apparatus 1 and the exterior thereof is not limited to wireless information communication using the antenna 125, but may be carried out using cables.

The image capturing unit 11 and the body casing 121 may be constructed removably from each other.

While the invention has been described in detail, the foregoing description is in all aspects illustrative and not restrictive. It is understood that numerous other modifications and variations can be devised without departing from the scope of the invention.

What is claimed is:

1. A portable information communication apparatus for conducting information communication, comprising:
   an image capturing device for obtaining an image of a subject through a zoom optical system;
   a body casing connected to said image capturing device;
   a communicator for conducting information communication with the exterior;
   a display disposed on said body casing for displaying said image obtained by said image capturing device;
   a rotating mechanism for changing a positional relationship of said image capturing device and said body casing relative to each other between a first position in which an optical axis of said image capturing device and a display screen of said display are substantially parallel to each other and a second position in which said optical axis of said image capturing device and said display screen of said display are substantially perpendicular to each other; and
   a manual operation device for accepting a user's operation associated with information communication when in said first position and for accepting a user's operation associated with image capturing when in said second position, said manual operation device comprising a rotary member for accepting a push in operation and a rotary operation.

2. The information communication apparatus according to claim 1, wherein the length of said image capturing device along said optical axis is approximately equal to the width of said body casing along said optical axis when in said first position.

3. The information communication apparatus according to claim 1, further comprising a group of control buttons provided on a surface of said body casing facing in substantially the same direction as said display screen for accepting a user input.

4. The information communication apparatus according to claim 1, wherein said rotary operation of said rotary member effects a change in magnification of said zoom optical system when in said second position.

5. The information communication apparatus according to claim 1, wherein said push in operation of said rotary member effects a release operation when in said second position.

6. A portable apparatus comprising:
   a first body for housing a photoelectric conversion device and an optical system for image-forming a subject image on said photoelectric conversion device, a first dimension of said first body along an optical axis of said optical system being longer than a second dimension of said first body in a direction perpendicular to said optical axis of said optical system;
   a second body including a display for displaying an image based on image data outputted from said photoelectric conversion device, a first dimension of said second body in a direction perpendicular to a screen of said display being shorter than a second dimension of said second body in a direction parallel to said screen of said display;
   a communication unit for communicating with an external device, said communication unit being capable of transmitting said image data outputted from said photoelectric conversion device;
   a connecting member for connecting said first body and said second body to each other, said connecting member being movable between a first position in which said optical axis of said optical system is substantially parallel to said screen of said display and a second position in which said optical axis of said optical system is substantially perpendicular to said screen of said display;
   a detector for detecting whether a positional relationship of said optical axis of said optical system and said screen of said display is in said first position or in said second position; and
   a controller to switch between a plurality of operating modes in accordance with a result of detection of said detector.

7. The portable apparatus according to claim 6, wherein a first dimension of said optical system along said optical axis is longer than a second dimension of said optical system in a direction perpendicular to said optical axis.

8. The portable apparatus according to claim 6, wherein a dimension of said optical system in a direction perpendicular to said optical axis of said optical system is approximately equal to said first dimension of said second body.

9. The portable apparatus according to claim 6, further comprising
   a manual operation member provided on a surface of said second body facing in substantially the same direction as said screen of said display.

10. The portable apparatus according to claim 6, wherein the plurality of operating modes comprises an image capturing mode and a communication mode.

* * * * *